(12) United States Patent
Chotin et al.

(10) Patent No.: US 7,779,395 B1
(45) Date of Patent: Aug. 17, 2010

(54) SYSTEM AND METHOD FOR ROUTING DATA

(75) Inventors: Matthew H. Chotin, San Francisco, CA (US); Eliot Greenfield, Oakland, CA (US); David George, Redwood City, CA (US); Glen Daniels, Arlington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1530 days.

(21) Appl. No.: 10/795,120

(22) Filed: Mar. 5, 2004

(51) Int. Cl.
*G06F 9/45* (2006.01)
(52) U.S. Cl. .................. 717/137; 717/140; 717/153
(58) Field of Classification Search ............... None
See application file for complete search history.

(56) References Cited

U.S. PATENT DOCUMENTS 6,915,301 B2 * 7/2005 Hirsch .................. 707/102
6,996,556 B2 * 2/2006 Boger et al. ............... 707/3

* cited by examiner

*Primary Examiner*—Chuck O Kendall
(74) *Attorney, Agent, or Firm*—Kilpatrick Stockton LLP

(57) ABSTRACT

A system and method is disclosed for routing data of a declarative source expression to a destination. Declarative source expressions are analyzed at compile-time to discover variable properties. As such properties are discovered, a binding object is created and a list of watcher objects is generated associated with the particular variable properties. The watcher object includes a change event notification which is broadcast when a change in the property is detected. When a change event notification is received, a binding object, which is also automatically generated by the compiler, is executed causing the variable property to be read and the declarative source expression to be re-evaluated which propagates the property changes through the application.

24 Claims, 3 Drawing Sheets

SYSTEM AND METHOD FOR ROUTING DATA

TECHNICAL FIELD

The present invention relates, in general, to software applications, and, more specifically, to routing dynamic data from a source to a destination within a software application.

BACKGROUND OF THE INVENTION

The evolution of computers has brought convenience and information to the masses. In the early days, a computer program included the data that it used to operate. Except for any user-entered data that was processed by the application, data or information applications typically contained the information in local storage locations, such as registers, magnetic or optical disks, and/or hard drives. At compile-time, the compiler typically retrieved the data and made that data available to the application during runtime. With the growth of networking and the Internet, it became possible, and effective, to place data in a location remote from the running application. As this distributed computing grew, computer applications were implemented with variables or properties that were unassigned by the application. Instead, the computer application accessed the Internet or some other remote network to receive the data used in running the application. The distributed nature of this software application paradigm opened the door for dynamic information or processing applications in which remote data could be obtained in almost real-time allowing the user to view current, up to date information.

The process of receiving the incoming raw data and assigning it to the appropriate variables or properties within computer applications is generally referred to as data binding or data routing. Merely receiving a single instance of data is relatively straight forward. Data, that is associated with particular variables or properties, is simply copied to those variables or properties defined within the application. The difficulty arises in dynamic applications, where the information can continually change.

In order to implement such dynamic applications, a developer typically codes data monitors for each variable or property for which data is to be monitored. The developer then also associates the monitors with each data expression that references the variable or property. Because a monitor function is coded for each such variable or property, the developer needs to know, in advance, what variables or properties need to be watched. If incoming data or properties do not conform to what the developer expected, source data may not be supplied to its appropriate destination or may not be properly updated, and the information system breaks down. These problems have spurred the adoption of loose standards for binding and monitoring data. These loose standards, however, still provide for the developer to specifically define the variable or property to be monitored. The developer would typically include a specific group of code or script that would monitor for the data changes and then set the properties to the new value or changed data or properties.

BRIEF SUMMARY OF THE INVENTION

Representative embodiments of the present invention are related to a system and method for automatically routing source data to an appropriate destination. During compile-time, binding expressions from the application are analyzed to determine each source variable or source property reference within the application. A binding expression is typically a declarative statement in which a destination is assigned to its sources. Because the compiler automatically determines the sources, arbitrary source references within the application may be bound and data routed to the appropriate destination without extra coding effort by developers.

Once the sources have been identified by the compiler, a binding object is automatically generated to assign values of new data or properties of the source to the appropriate destination. The compiler also generates a list of watcher objects for each variable property that is associated with each binding expression that references the variable property. These watcher objects monitor each variable or property. The watcher objects also include a change event function causing an event notification to be communicated when changes are detected to the variable or property. While the binding object is generated during compile-time, each watcher object is generated during runtime in various embodiments of the present invention. Therefore, when data or properties are changed, a change event is transmitted. As these change events are observed, the watcher object calls the binding object, which, in turn, reads the new property to use it in re-executing the source expression. Thus, the destination is updated through the application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
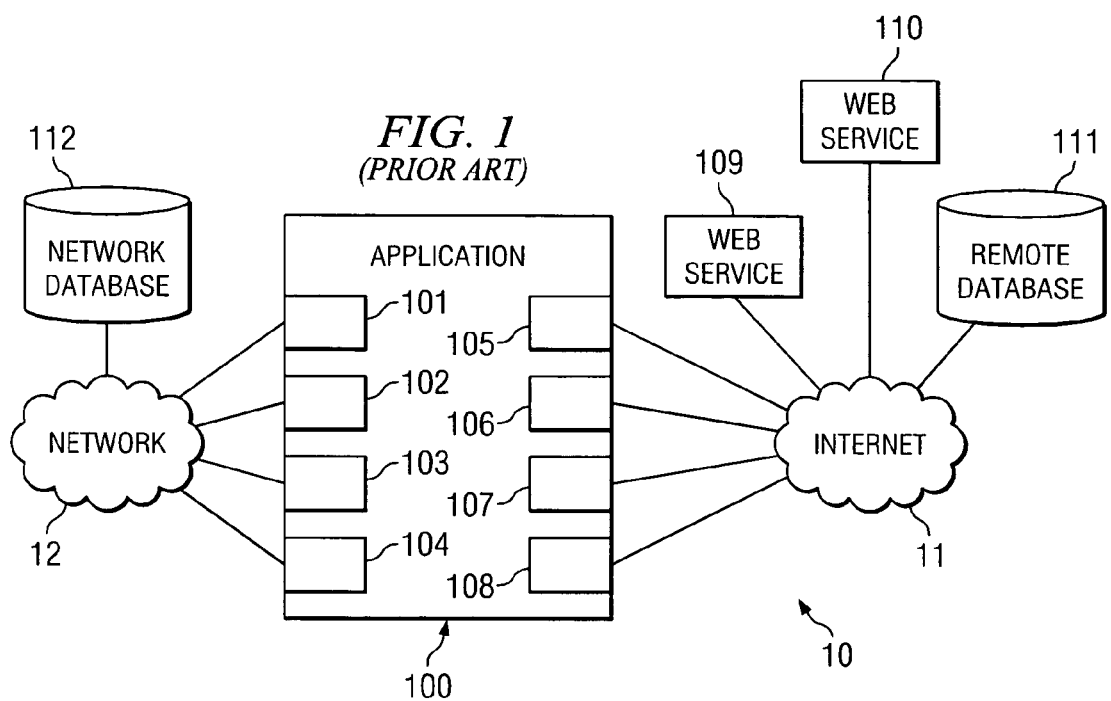
FIG. 1 is a block diagram illustrating a typical relationship between source and destination elements in a dynamic data system.

FIG. 1 is a block diagram illustrating a typical relationship between source and destination elements in dynamic data system 10. Application 100 includes a number of variables or properties, destinations 101-108, in which data may be loaded and updated on an ad hoc or continuing basis. For example, data or properties may be remotely gathered or stored by Web services 109 and 110, and remote database 111. Application 100 may communicate with such Web services 109 and 110, and remote database 111 using Internet 11. Similarly, data or properties may be stored or gathered in remote network database 112. Application 100 communicates with remote network database 112 using network 12. As data or properties are downloaded from any of Web services 109 and 110, remote database 111, and/or remote network database 112, the code watchers and binding objects created by the developers shepperd the data or properties into their appropriate destinations, destinations 101-108.

Figure 2:
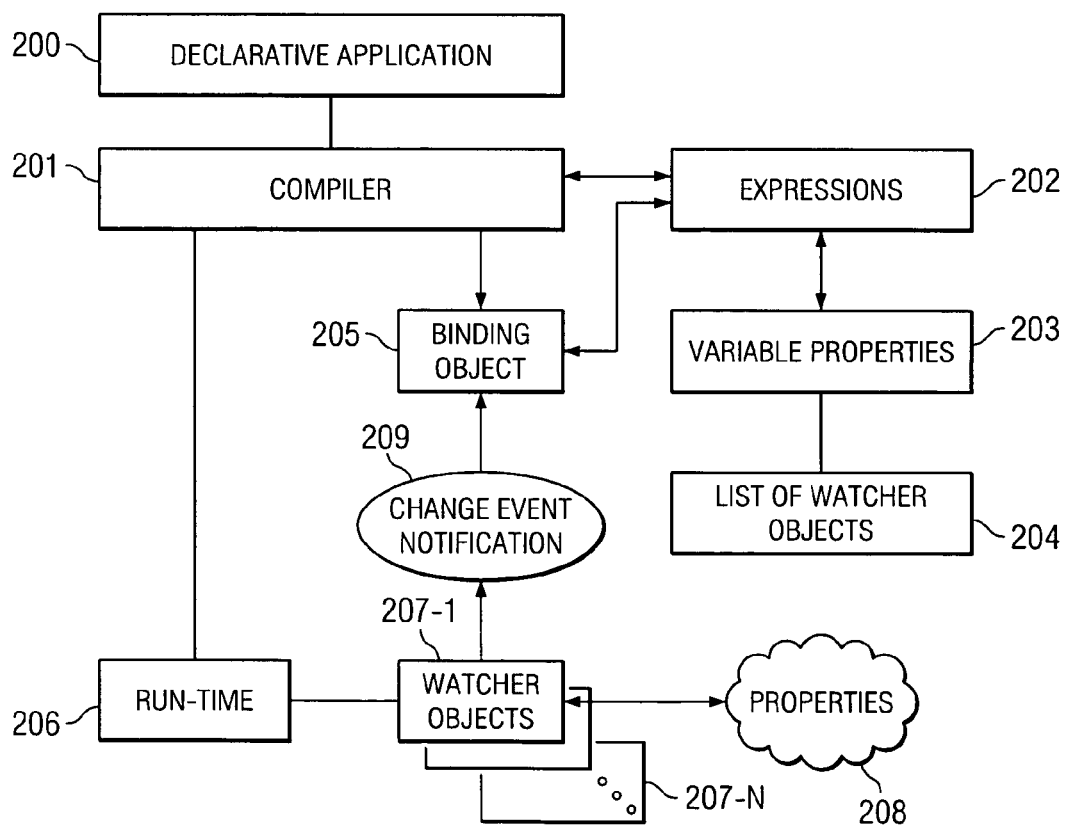
FIG. 2 is a block diagram illustrating one embodiment of the present invention.

FIG. 2 is a block diagram illustrating one embodiment of the present invention. Declarative application 200 is compiled by compiler 201 for transforming application 200 into executable bytecode for runtime 206. During compile-time, the compiler examines and evaluates source reference declarations, such as expressions 202, contained in application 200 to determine which sources constitute variable properties 203. For example, the compiler may parse the declarative source expression into a node tree and attempt to evaluate each node to determine whether that node is a constant or variable.

Once variable properties 203 are identified by compiler 201, list of watcher objects 204 is created and associated with expressions 202 that include expressions that reference the sources of variable properties 203. The compiler also automatically generates binding object 205 which controls the re-evaluation of source expressions 202 when property changes are detected. At runtime 206, watcher objects 207-1-207-N are created to monitor properties 208 for any changes to variable properties 203. For purposes of this example, the data and dynamic properties from the external sources are conceptually stored in properties 208. When changes are detected, watcher objects 207-1-207-N generate and transmit change event notification 209 to binding object 205. Binding object 205 then reads the new property for purposes of re-executing expressions 202. Thus, the new, updated data source is bound to its associated destination.

It should be noted that the various embodiments of the present invention may be implemented in an application development environment that will automatically generate watcher objects for each detected source and automatically generate binding or routing objects that assign new values to the variable properties when property changes are detected. One example of such an application development environment is MACROMEDIA INC.'s FLEX™. FLEX™ is a development environment utilizing server-side code that assists in developing rich Internet applications. The FLEX™ server delivers a standards-based, declarative programming methodology and workflow along with runtime services for developing and deploying the presentation tier of rich client applications. FLEX™ utilizes MACROMEDIA FLASH™ as a container for delivering rich media applications to a client.

Figure 3:
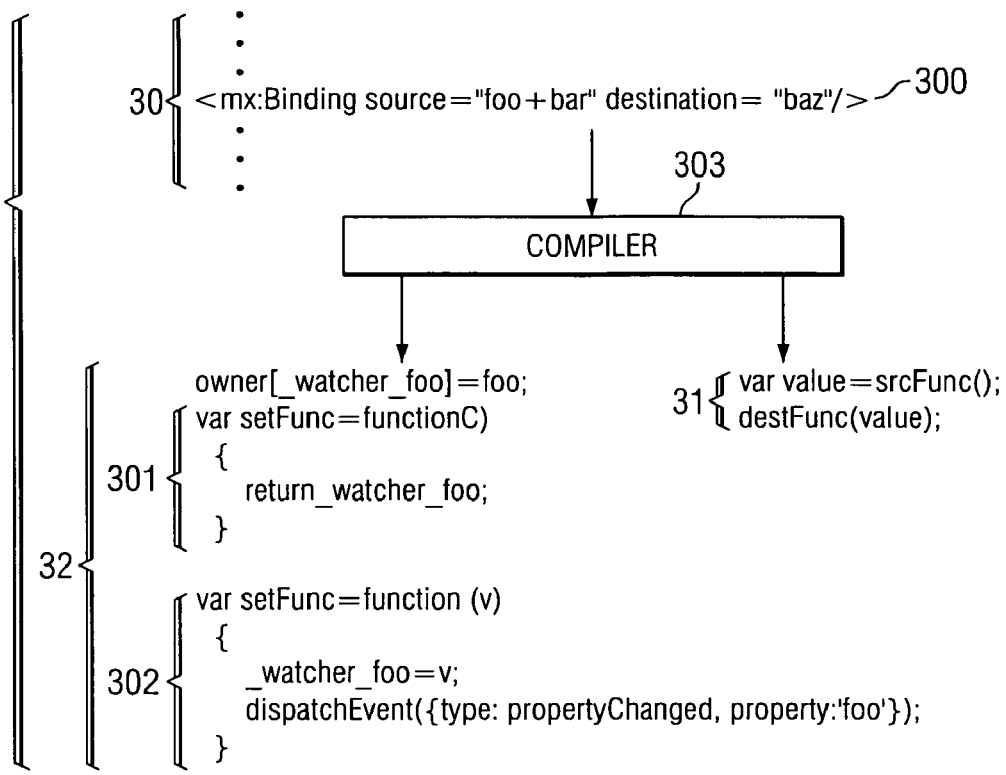
FIG. 3 is a combined block diagram and pseudocode listing illustrating one embodiment of the present invention.

FIG. 3 is a combined block diagram and pseudocode listing illustrating another embodiment of the present invention. Application 30 includes binding expressions, such as binding expression 300. As application 30 is compiled by compiler 303, compiler 303 analyzes application 30 to determine the variable sources within binding expressions, such as the source properties "foo" and "bar" from the source expression "foo+bar" of binding expression 300. In response to discovering these source properties, compiler 303 generates binding object 31 and watcher object 32. For purposes of this example, watcher object 32 is shown for the source "foo." In practice, a similar watcher object would be generated for the source "bar" as well.

It should be noted that unlike the embodiment depicted in FIG. 2, compiler 303, shown in an alternative or additional embodiment of FIG. 3, not only automatically generates binding object 31, but also automatically generates watcher object 32.

Binding object 31 is a generic evaluation object that calls binding expression 300 to evaluate binding expression 300 using a changed property. The variable "value" is set to the source function, srcFunc( ) which returns the value of the source. The destination function, destFunc( ) is then executed with the "value" parameter, thus, routing or binding the source to the destination.

Upon creation of watcher object 32, at least two functions are created, getter function 301, getFunc( ) which is a function that a destination element or other element that references "foo" would call to obtain the value of the source, and setter function 302, setFunc( ) which updates the value of the source and, if a change is detected, dispatches an event that "foo" has changed. When the change event is communicated, binding object 31 causes the source expression "foo+bar," to re-evaluate using the new value of "foo" and assigns the re-evaluated result to its destination, baz.

It should be noted that the various embodiments of the present invention allow the developer to code or tag the identity of the source. The compiler can then identify the destination from the coded/tagged source. The compiler also identifies whether the source is variable, and if so, generates binding objects, as well as creates a list of properties for which to generate watcher objects. The compiler may also make the association of the list of watcher objects to the binding expressions that reference the variable properties. Therefore, the developer's coding responsibilities are reduced substantially for increased functionality.

Figure 4:
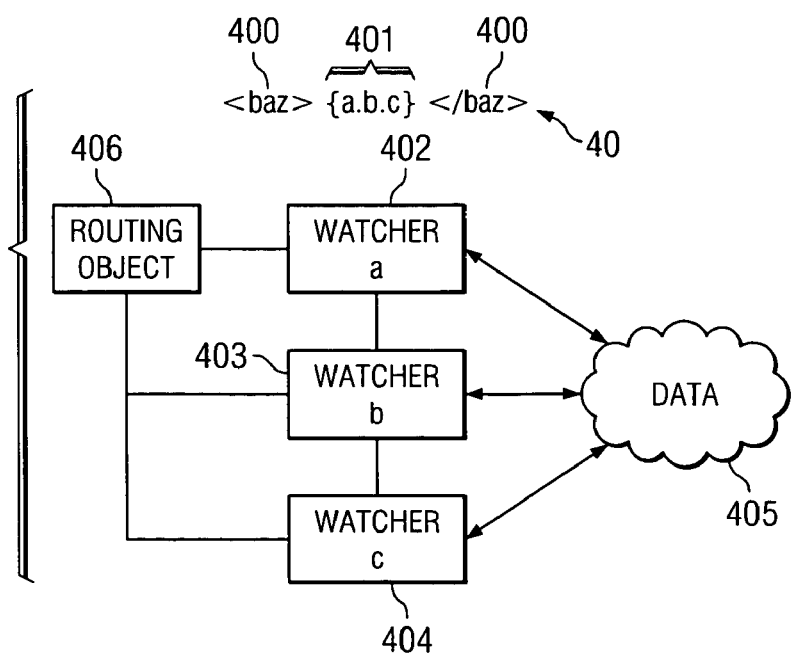
FIG. 4 is a block diagram illustrating an additional embodiment of the present invention.

One of the benefits to the various embodiments of the present invention is the ability to handle the data routing for arbitrary source expressions, even complex expressions. FIG. 4 is a block diagram illustrating an additional embodiment of the present invention. Binding expression 40 includes destination expression 400, <baz></baz>, and complex source expression 401, a.b.c. Source expression 401 represents a three-tiered, nested source expression. Each of the three levels is associated with the other level in a hierarchical relationship. Therefore, when compiling binding expression 40, the compiler generates watcher-a 402, watcher-b 403, and watcher-c 404 to watch each of the sources of source expression 401. Each parent watcher is also coded to re-designate itself and its children watchers if a change occurs for a variable property watched by the parent watcher.

Watchers 402-404 monitor data 405 for any changes in the properties. If a change is detected in watcher-b 403, for example, watcher-c 404 is checked for any related property changes. When changes are confirmed and a change event dispatched, routing object 406 causes the new source values to be assigned to their respective destinations and watcher-b 403 and watcher-c 404 are re-designated for the changed property. Watcher-a 402, as the ultimate parent, remains unchanged in the example embodiment described in FIG. 4.

Figure 5:
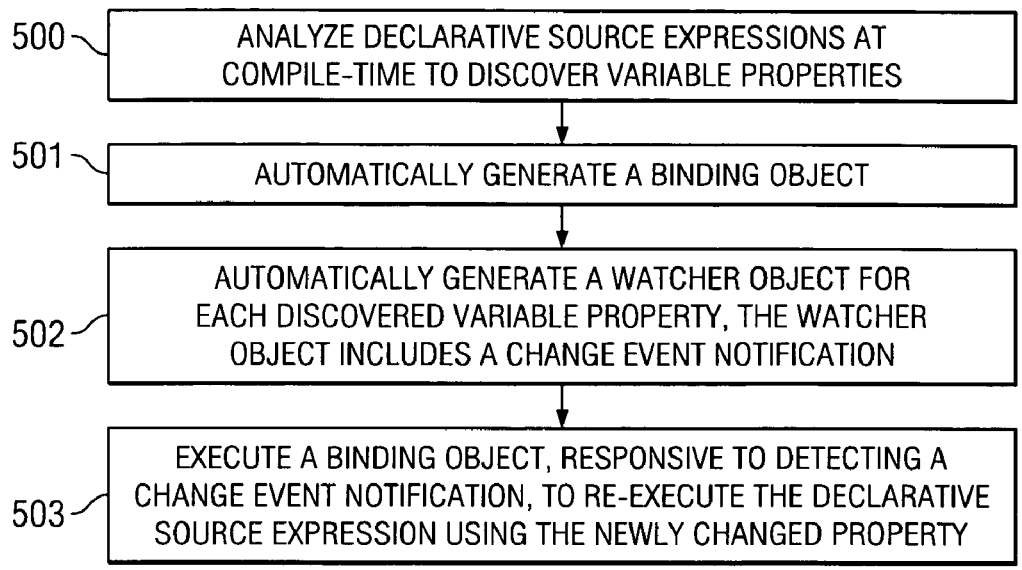
FIG. 5 is a flowchart identifying representative steps operable to implement one embodiment of the present invention.

FIG. 5 is a flowchart identifying representative steps operable to implement one embodiment of the present invention.

In step 500, declarative source expressions are analyzed at compile-time to discover variable properties. In step 501, a binding object is also automatically generated. Watcher objects are automatically generated, in step 502 for each discovered variable property, the watcher objects also include a change event notification. The binding object is then executed, in step 503, responsive to detecting a change event notification, to re-execute the declarative source expression using the newly changed property.

Figure 6:
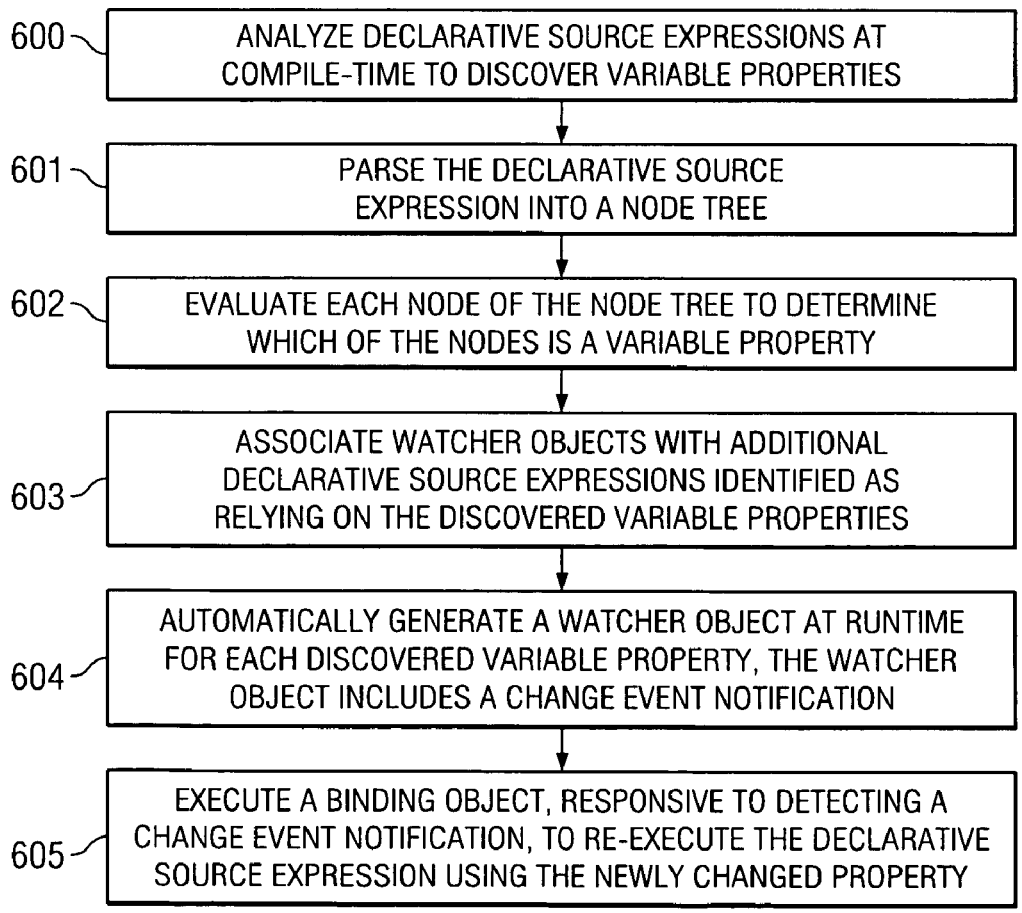
FIG. 6 is a flowchart identifying additional representative steps operable to implement another embodiment of the present invention.

FIG. 6 is a flowchart identifying additional representative steps operable to implement another embodiment of the present invention. In step 600, declarative source expressions are parsed into a node tree. Each node of the node tree is then evaluated, in step 601, to determine which of the nodes is a variable property. In step 602, a binding object is automatically generated. Watcher objects are associated with the declarative source expressions identified as relying on the discovered variable properties in step 603. Those watcher objects are automatically generated at runtime, in step 604, for each discovered variable property, the watcher object includes a change event notification. A binding object is then executed, in step 605, responsive to detecting a change event notification to re-execute the declarative source expression using the newly changed property.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for routing data of a declarative source expression to a destination, said method comprising:
   analyzing said declarative source expression of an application at compile-time on a dynamic data system to discover a variable property in the declarative source expression of the application;
   automatically generating executable code for creating a watcher object at runtime for the variable property discovered in the declarative source expression of the application, said executable code being configured to observe a change in the variable property discovered in the declarative source expression of the application and to provide a change event notification when the change in the variable property discovered in the declarative source expression of the application is observed; and
   automatically generating executable code for creating a binding object that acts in response to the change event notification at runtime to cause the declarative source expression of the application to be executed with the change in the variable property discovered in the declarative source expression of the application.

2. The method of claim 1 further comprising:
   automatically generating a binding expression at compile-time comprising:
      the variable property of said declarative source expression; and
      said destination.

3. The method of claim 2 further comprising:
   evaluating said binding expression after execution of said binding object.

4. The method of claim 1 wherein said analyzing step comprises:
   parsing said declarative source expression into a node tree;
   evaluating each node of said node tree to determine which of said nodes is a variable property.

5. The method of claim 1 further comprising:
   identifying additional declarative source expressions relying on the variable property.

6. The method of claim 5 further comprising:
   associating said watcher object with said additional declarative source expressions identified as relying on the variable property.

7. A computer program product having computer program logic recorded on a computer readable medium, the computer program product comprising:
   code for parsing a declarative source expression into a node tree at compile time of an application;
   code for examining said node tree to discover a variable property in the node tree;
   code for automatically generating executable code for creating, at runtime, a watcher object associated with the variable property discovered from the node tree, said watcher object being configured to observe a change in the variable property discovered from the node tree and to provide a change event notification when the change in the variable property discovered from the node tree is observed;
   code for automatically generating executable code for creating a binding object that acts in response to the change event notification at runtime to cause the declarative source expression of the application to be executed with the change in the variable property discovered from the node tree.

8. The computer program product of claim 7 further comprising:
   code for automatically creating a routing expression at compile time comprising:
      the variable property of the declarative source expression; and
      a destination within the application for data from a source.

9. The computer program product of claim 8 further comprising:
   code for evaluating said declarative source expression after execution of said binding object.

10. The computer program product of claim 7 wherein said code for examining comprises:
    code for evaluating each node of said node tree to determine which of said nodes is said variable property.

11. The computer program product of claim 7 further comprising:
    code for identifying additional declarative source expressions using the variable property.

12. The computer program product of claim 11 further comprising:
    code for associating said watcher object with said additional declarative source expressions identified as using the variable property.

13. A data binding system for at least one declarative source expression in a dynamic data application, said data binding system comprising:

a computer comprising a compiler that is capable of compiling the dynamic data application by:
discovering a variable property in the at least one declarative source expression in the dynamic data application;
automatically generating executable code for creating a watcher object at runtime for the variable property, the executable code being configured to detect a change in the variable property; and
automatically generating executable code for creating a binding object during runtime, the executable code for creating the binding object being configured to cause execution of said at least one declarative source expression in the dynamic data application using said change in the variable property,
wherein the dynamic data application compiled by the compiler is capable of being stored on the computer.

14. The data binding system of claim 13 wherein the watcher object is associated with a change event notification configured to be provided in response to detecting the change.

15. The data binding system of claim 14 wherein said binding object is configured to cause execution of said at least one declarative source expression responsive to receipt of said change event notification.

16. The data binding system of claim 13 wherein the variable property comprises a plurality of variable properties and the watcher object comprises a plurality of watcher objects configured to be associated with the plurality of variable properties, wherein the compiler is configured to create the plurality of watcher objects.

17. A method comprising:
monitoring a variable property within a declarative source expression in an application on a dynamic data system for a property change during runtime on the dynamic data system, the variable property being discovered during compile-time on the dynamic data system;
providing a change event notification upon a detection of said property change during runtime; and
responsive to the change event notification, executing said declarative source expression in the application during runtime using said property change.

18. The method of claim 17 wherein monitoring the variable property within the declarative source expression in the application on the dynamic data system for a property change comprises monitoring a plurality of variable properties from a list constructed during compile-time.

19. The method of claim 17 wherein said monitoring comprises:
using code for a property monitor object generated at compile-time for the variable property.

20. The method of claim 17 further comprising:
triggering execution of the declarative source expression by a binding object upon receipt of the change event notification, the binding object being created at compile-time.

21. A system for binding data into a declarative source expression comprising:
a computer comprising a watcher object and a binding object,
the watcher object being capable of watching a variable within the declarative source expression in an application for a change during runtime, the variable being discovered during compile-time, and being capable of transmitting a change event upon a detection of said change during runtime,
the binding object being capable of, in response to the change event, executing said declarative source expression in the application using said change during runtime.

22. The system of claim 21 wherein the watcher object is capable of watching the variable within the declarative source expression in the application for a change during runtime by watching a plurality of variables from a list constructed during compile-time.

23. The system of claim 21 wherein the watcher object is capable of using code created at compile-time for the variable.

24. The system of claim 21 wherein the binding object is capable of being triggered upon receipt of the change event.

* * * * *

UNITED STATES PATENT AND TRADEMARK OFFICE
CERTIFICATE OF CORRECTION

| | | |
|---|---|---|
| PATENT NO. | : 7,779,395 B1 | Page 1 of 1 |
| APPLICATION NO. | : 10/795120 | |
| DATED | : August 17, 2010 | |
| INVENTOR(S) | : Matthew H. Chotin et al. | |

It is certified that error appears in the above-identified patent and that said Letters Patent is hereby corrected as shown below:

In the Claims:

Column 6, Claim 12, Line 3,
Delete the word "watcher" and insert the word --binding-- in place thereof.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,779,395 B1 | Page 1 of 1 |
| APPLICATION NO. | : 10/795120 | |
| DATED | : August 17, 2010 | |
| INVENTOR(S) | : Matthew H. Chotin et al. | |

It is certified that error appears in the above-identified patent and that said Letters Patent is hereby corrected as shown below:

In the Claims:

Column 6, line 63 (Claim 12, Line 3)
Delete the word "watcher" and insert the word --binding-- in place thereof.

This certificate supersedes the Certificate of Correction issued November 2, 2010.

Signed and Sealed this

Seventh Day of December, 2010

David J. Kappos
*Director of the United States Patent and Trademark Office*